(12) United States Patent
Hocker

(10) Patent No.: US 7,315,368 B2
(45) Date of Patent: Jan. 1, 2008

(54) SPECTRA GENERATOR FOR TEST AND CALIBRATION

(75) Inventor: G. Benjamin Hocker, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 249 days.

(21) Appl. No.: 10/946,748

(22) Filed: Sep. 22, 2004

(65) Prior Publication Data

US 2006/0061758 A1    Mar. 23, 2006

(51) Int. Cl.
*G01J 3/02*    (2006.01)
*G01J 3/28*    (2006.01)

(52) U.S. Cl. ..................... 356/243.1; 356/328
(58) Field of Classification Search ............ 356/243.1, 356/310, 326, 328, 330; 359/573
See application file for complete search history.

(56) References Cited

U.S. PATENT DOCUMENTS

| 5,757,536 | A | 5/1998 | Ricco et al. | |
|---|---|---|---|---|
| 5,905,571 | A | 5/1999 | Butler et al. | |
| 6,664,706 | B1 | 12/2003 | Hung et al. | |
| 6,894,836 | B2 * | 5/2005 | Christenson | 359/573 |
| 2002/0105725 | A1 * | 8/2002 | Sweatt et al. | 359/566 |
| 2002/0191913 | A1 | 12/2002 | Hocker et al. | |
| 2004/0145737 | A1 | 7/2004 | Hocker | |

FOREIGN PATENT DOCUMENTS

WO    WO0205008 A1    1/2002

OTHER PUBLICATIONS

Hocker et al., "The Polychromator: A Programmable MEMS Diffraction Grating for Synthetic Spectra," Solid-State Sensor and Actuator Workshop, Hilton Head Island, South Carolina, pp. 89-92 Jun. 2000.
Sinclair et al., "Synthetic spectra: a tool for correlation spectroscopy," Applied Optics, vol. 36, No. 15, pp. 3342-3348, May 20, 1997.
Srinivasan, Technology, Applications, and Future of Micro-ElectroMechanical Systems (MEMS) and Micro-Opto-ElectroMechanical Systems (MOEMS), PARC Palo Alto Research Center 13 pages Feb. 26, 2004.

* cited by examiner

*Primary Examiner*—F. L. Evans
(74) *Attorney, Agent, or Firm*—Black Lowe & Graham PLLC

(57) ABSTRACT

A spectra generator having an electrically programmable diffraction grating. There may be a broad band light source that emits light which is diffracted by the grating. Diffracting elements in the grating may be individually adjustable so that generation of a specific spectrum or spectra may be achieved. The diffracting elements may be adjusted according to electrical signals of a program from a computer. The generated synthetic spectra may be used for testing and calibration of spectrometers or other devices. Synthetic spectra may also be used for scene generation and other purposes.

14 Claims, 6 Drawing Sheets

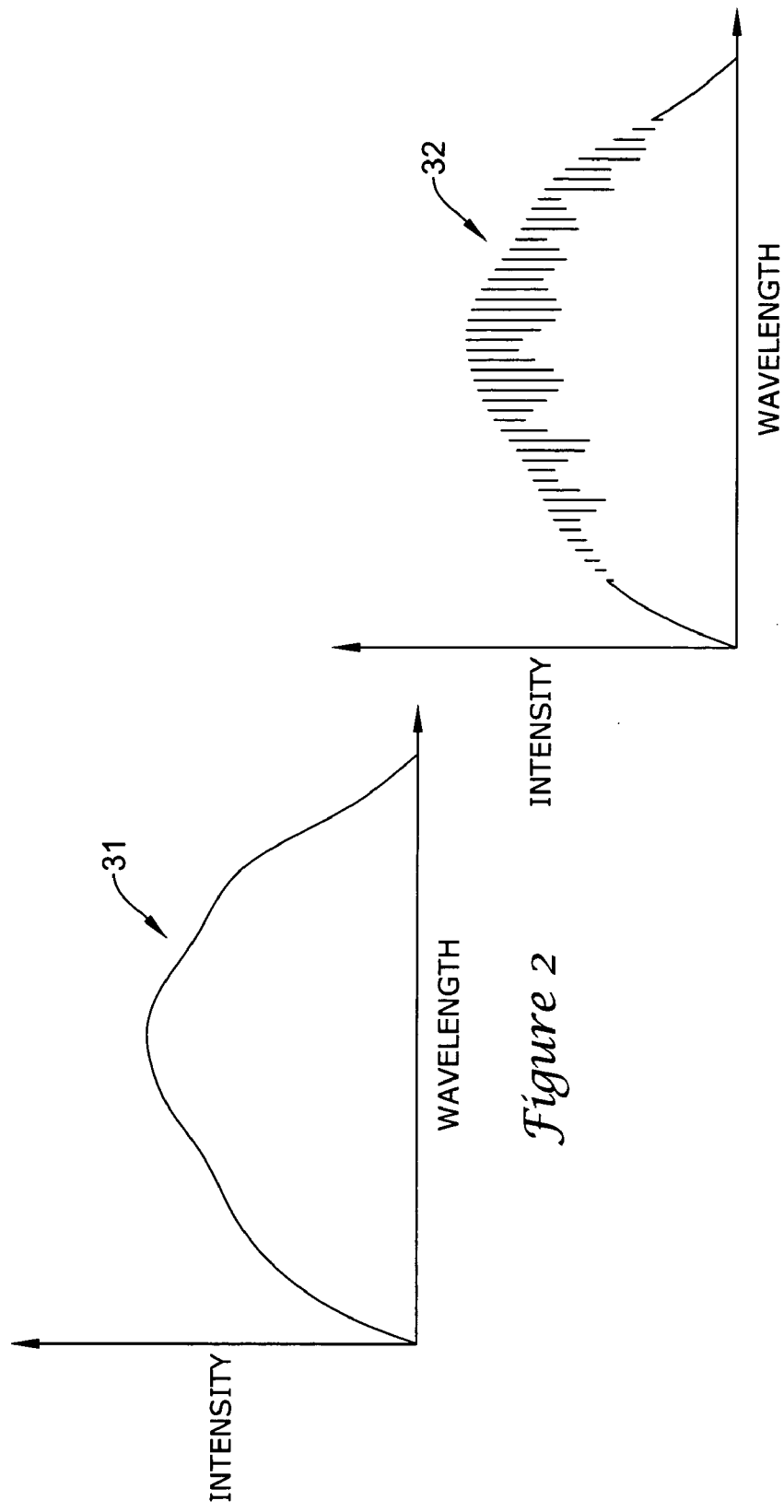

SPECTRA GENERATOR FOR TEST AND CALIBRATION

BACKGROUND

The present invention pertains to spectra and particularly infrared spectra of various substances. More particularly, the invention pertains to the generation of synthetic spectra and use of such spectra in testing and calibration of spectrometers.

The invention may be related to U.S. Pat. No. 5,905,571, by Butler et al. issued May 18, 1999, and entitled "Optical Apparatus for Forming Correlation Spectrometers and Optical Processors"; U.S. Pat. No. 5,757,536, by Ricco et al., issued May 26, 1998, and entitled "Electrical-Programmable Diffraction Grating; and U.S. Pat. No. 6,664,706, by Hung et al., issued Dec. 16, 2003, and entitled "Electrostatically-Controllable Diffraction Grating"; which are herein incorporated by reference. The invention may also be related to U.S. patent application Ser. No. 10/352,828, by Hocker, filed Jan. 28, 2003, and entitled "Programmable Diffraction Grating Sensor"; and U.S. patent application Ser. No. 09/877,323, by Hocker et al., filed Jun. 8, 2001, and entitled "Apparatus and Method for Processing Light", which are herein incorporated by reference.

SUMMARY

The invention may be an apparatus and method for the testing and calibration of spectrometers using generated synthetic spectra. These generated synthetic spectra may be used for other purposes such as scene generation.

BRIEF DESCRIPTION OF THE DRAWING

FIG. 2 is an intensity versus wavelength graph of radiation from an example black body;

FIG. 3 is an example spectrum that may represent the absorption of infrared light by a particular substance;

DESCRIPTION

Spectrometers may be used to detect molecules in the atmosphere by observing the characteristic spectra of light absorbed by the molecules. Such spectrometers should be tested and calibrated with spectra that resemble the target molecules. Creating test spectra by using samples of the molecules, such particular species of them, may be inconvenient, time consuming and expensive. Additionally, using samples of the actual molecules may be hazardous if the species are toxic. Specifically, military systems used for standoff chemical agent detection need capabilities for test and calibration with actual spectral input representing the chemical agents to be detected, but without the need to use samples of actual toxic chemical agents.

Figure 1:
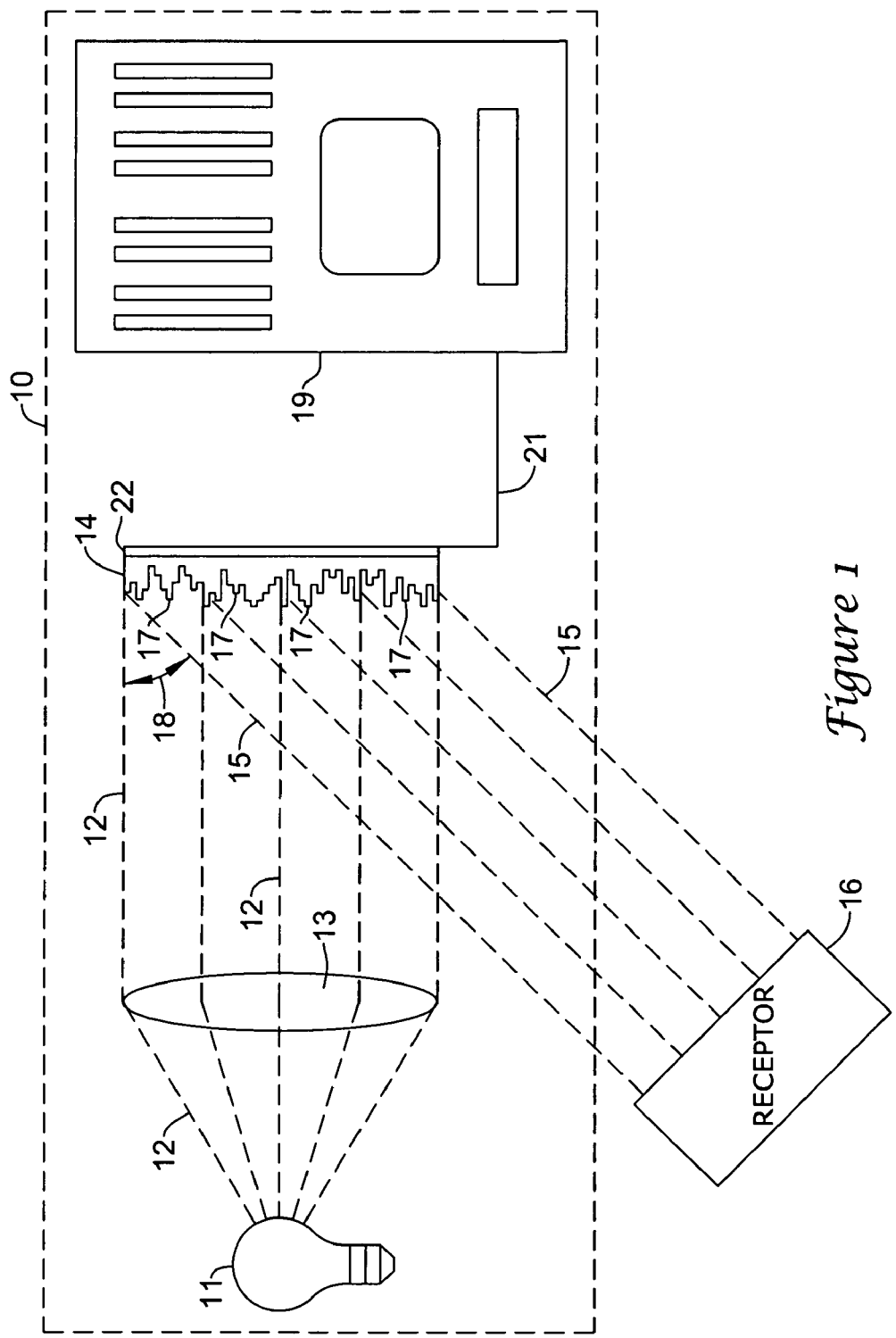
FIG. 1 is a schematic of a spectra generator having an electrically programmable reflective diffraction grating.
Figure 7:
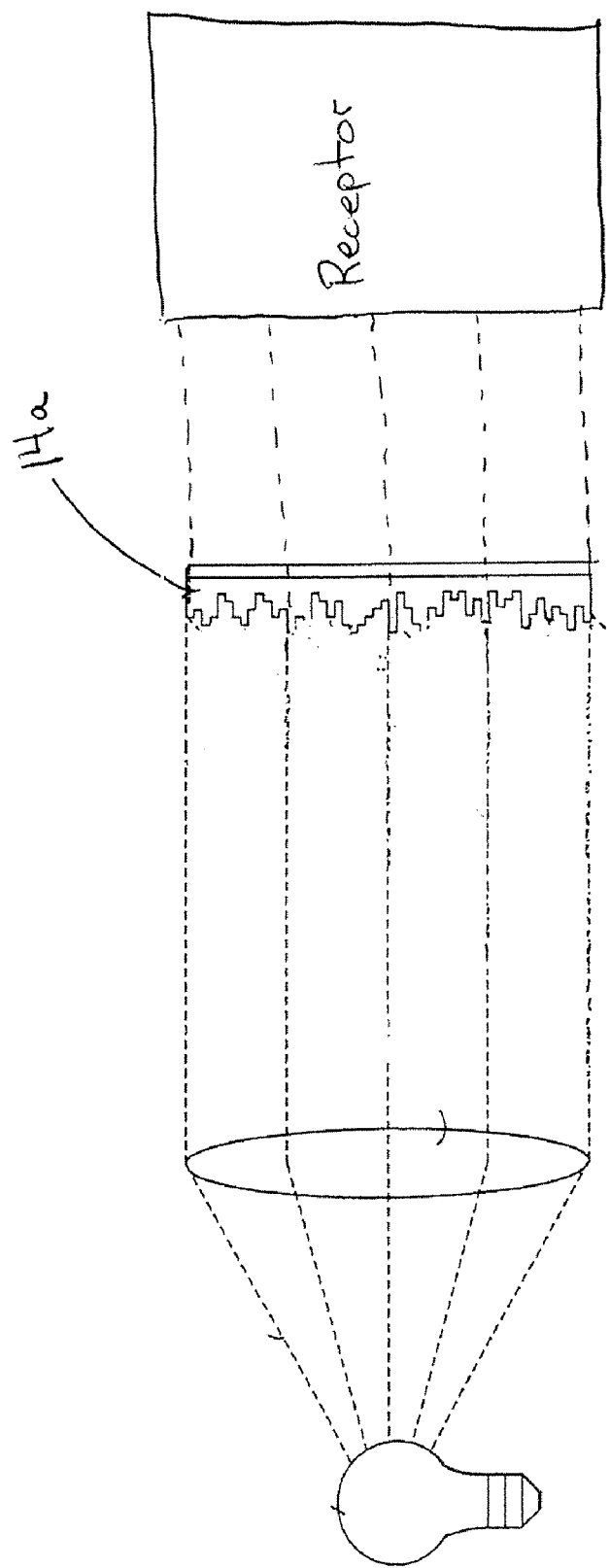
FIG. 7 shows a light diffracting mechanism with a transmissive grating.

In FIG. 1, a generator 10 of spectra is shown. A light source 11 may output light 12 of a black body, that is, broadband infrared light. A lens 13 may collimate light 12 for impingement on a diffractive grating 14. Electrically programmable diffractive grating 14 may reflect broadband light 12 as spectra light 15. The design may instead incorporate a transmissive grating 14a (FIG. 7) in lieu of the reflective grating. The reflective grating may be generally referred to here.

Spectra light 15 may be detected by a spectrometer 16. Light 15 may be a synthesization of a light spectrum resulting from absorption by a specific substance. If spectrometer 16 is functioning properly, then it may identify that that spectrum light 15 to be that of the specific substance. The light 15 beam width may be adjusted with a beam expander or beam compressor so that light 15 is more effectively transmitted and detected by spectrometer 16. The spectrometer 16 may be moved relative to the diffractive elements 17, thereby affectively adjusting an angle of position relative to the diffractive elements 17. The heights of the diffractive elements 17 may be set with electrical signals from a computer 19 via a connection 21 to an interconnection base 22 attached to grating 14. Computer 19 may be programmed to provide ready-made settings for the elements 17 to generate specific spectra of respective substances. Background about an electrically programmable diffraction grating may be disclosed in U.S. Pat. Nos. 5,905,571 and 5,757,536, and U.S. patent application Ser. No. 09/877,323.

The electrically programmable diffraction grating 14 may transform broadband light 12 into spectra light 15 in accordance with a dimension, such as the height of diffraction elements 17, relative to the base of diffractive gating 14. These dimensions of electrically programmable diffraction grating 14 in the Figures are not drawn to scale but are illustrative. The actual number of elements 17 may be over 1000, e.g., 1024. Also, angle 18 may be a factor affecting the synthesized spectra 15. The spectra of light 15 generated may be a function of the heights of the elements 17 and of angle 18 of the direction of diffracted light 15 relative to the direction of incident light 12 impinging grating 14. Each element 17 may have a unique height.

The heights of the elements 17 may be adjusted in order to generate various spectra in diffracted light 15. The heights of the diffractive elements 17 may be set with electrical signals from a computer 19 via a connection 21 to an interconnection base 22 attached to grating 14. Computer 19 may be programmed to provide ready-made settings for the elements 17 to generate specific spectra of respective substances. Background about an electrically programmable diffraction grating may be disclosed in U.S. Pat. Nos. 5,905,571 and 5,757,536, and U.S. patent application Ser. No. 09/877,323.

For instance, if a request is input to computer 19 for a spectrum of CO, than an element pattern may be sent to grating 14 which may result in an adjustment of elements 17 so as to result in a spectrum of CO being in diffracted light 15 sent to a receptor 16 such as a spectrometer. Elements 17 may be adjusted so as to reflect light 15 having spectra of more than one substance. Also, background may be added to the spectra of light 15. Spectrometer 16 may be tested with the reception of light 15 to determine detection capability of various substances among various backgrounds. Device 16 may be tested for identifying a spectrum of a particular substance or several substances buried in noise at one level or another. Computer 19 may provide spectra settings to elements 17 in a sequential fashion over a given period of time. Spectra for calibration of spectrometer 16 or other instrumentation may be provided via light 15. Further, a detection mechanism may be used added to device 16 to identify and verify the spectra being used for testing and calibrating spectrometers and the other instrumentation. Also, spectra may be generated for scene generation and the testing and/or calibration of microbolometers and other detection mechanisms.

FIG. 2 is a graph of intensity versus wavelength of infrared light. Curve 31 reveals a spectrum of black body source which may be light source 11 of generators 10. However, source 11 may emit other wavelengths of the like, such in the ranges of visible or UV light. FIG. 3 is an example of a spectrum 32 of light 15 after the light 12 is transmitted through a region containing a specific molecule. Light may be absorbed in spectral wavelengths in a pattern characteristic of that molecule.

Figure 4:
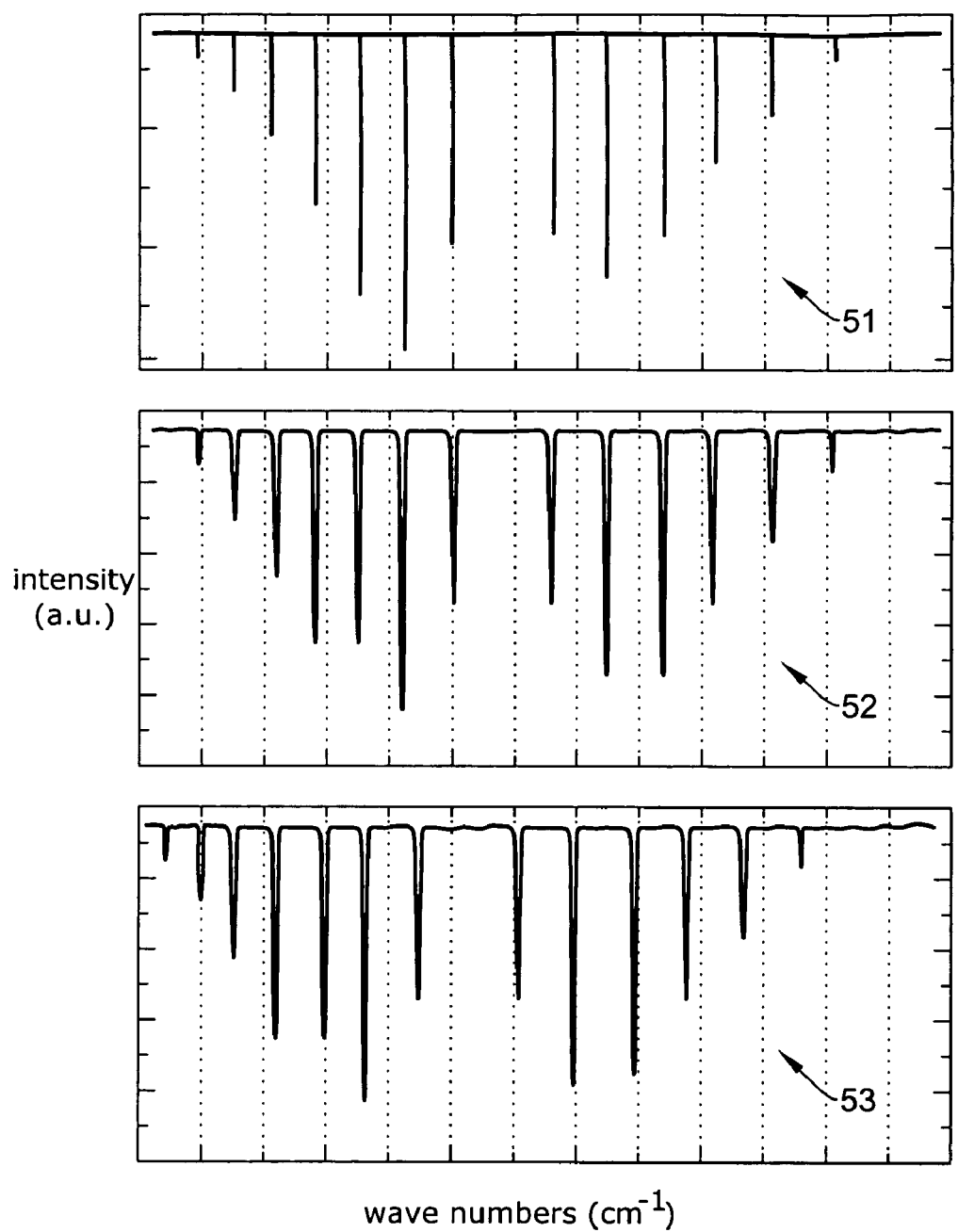
FIG. 4 is a diagram of an actual spectrum of HF, a simulated spectrum of HF and a displaced simulated spectrum of HF.

FIG. 4 shows a graph of three spectra of HF. The top spectrum may be regarded as an actual spectrum curve 51 of HF. Curve 52 may be a synthetic spectrum of HF as provided by spectra generator 10. Curve 53 is the same as curve 52 except that it is shifted to the right about 50 wave numbers. If the spectrum 52 is compared with the actual HF spectrum 51, and spectrum 52 is delayed periodically to the position of spectrum 53, spectrum 51 may be easier to detect when a comparison is done for calibrating the generator. Generators 10 may generate both a spectrum 52 and a displaced spectrum 53 of HF. This spectra displacement shifting may accommodate AC detection of an actual spectrum.

Figure 5:
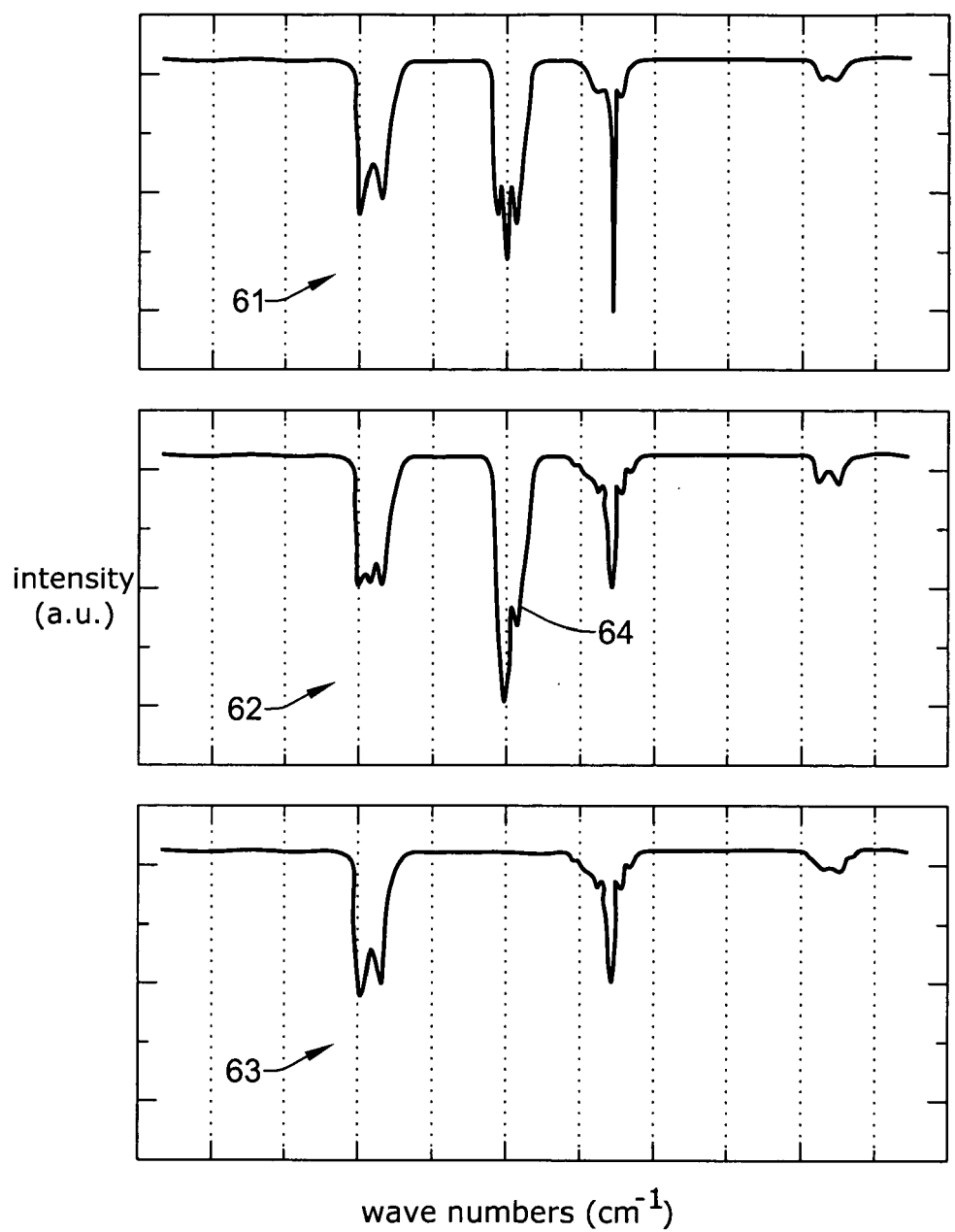
FIG. 5 is a diagram of an actual spectrum of TCE, a simulated spectrum of TCE and a modified simulated spectrum of TCE.

FIG. 5 shows an actual spectrum 61 of TCE and a synthetic spectrum 62 of TCE. Spectrum 62 may be provided by generators 10. Another provided spectrum 63 may effectively be spectrum 62 of TCE with the 850 cm.sup.−1 absorption line removed by generator 10 due to an adjustment of the elements 17 in diffractive grating 14, respectively.

Figure 6:
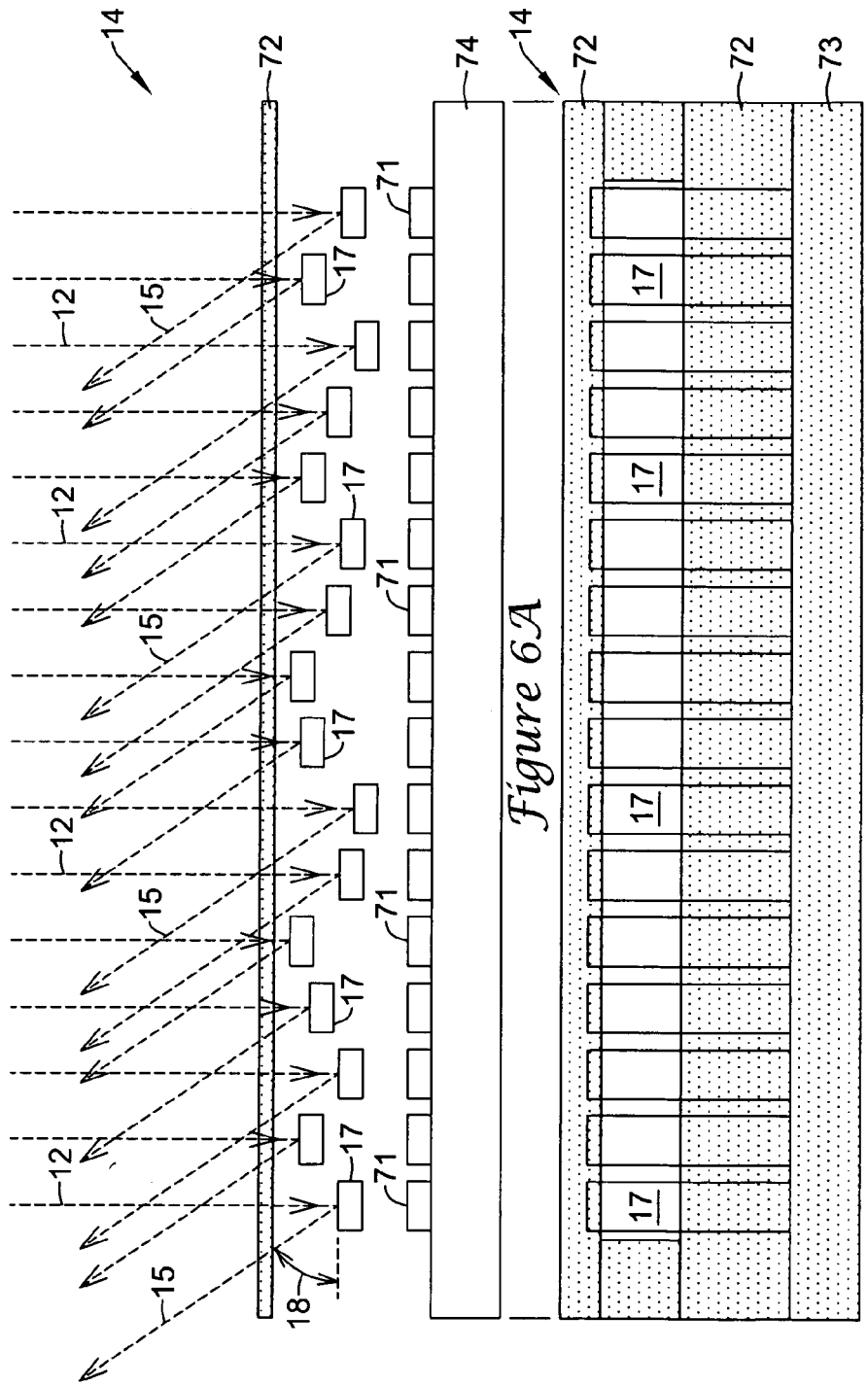
FIGS. 6a and 6b show end and top views, respectively, of an electrically adjustable grating.

FIGS. 6a and 6b show aligned end and top views of the adjustable grating 14 that may be used in generated 10. A basic structure of this adjustable grating 14 may be like that of grating 14, except that grating 23 may have a transparent property rather than a reflective one. Elements 17 may be pulled down electrostatically by elements 71. One polarity of a voltage source may be connected to all of the elements 17 at support 73. The other polarity of the voltage source may be connected to an individual element 71 positioned relative to its corresponding element 17. Elements 17 may be like flexible tongs that have a natural resting position close structure 72 and a fixed structural connection to structure 73. A magnitude of a voltage applied across element 17 and 71 may determine the position of element 17 relative to element 71. The greater the voltage magnitude, element 17 may be drawn closer to element 71. Thus, all elements 17 may be individually adjusted to achieve a particular and unique diffractive grating 14 setting for providing a desired spectrum from generator 10. The voltage inputs to elements 71 may be individual and different from one another. The base 74 is insulated so that elements 71 may be electrically isolated from one another and connected to an external signal source such as computer 19. The various sets of voltage inputs with their respective combinations of magnitudes may be programmed in computer 19. The positions of elements 17 and consequently grating 14 may be dynamically changed in a manner to get the effect of going from spectrum 52 to spectrum 53 of FIG. 5 or from spectrum 62 to spectrum 63 of FIG. 6.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. An apparatus comprising:
a diffracting mechanism having a plurality of adjustable elements, the adjustable elements have set positions to provide certain spectra upon impingement of radiation on the diffracting mechanism; and
a spectrometer configured to calibrate and/or test based on the certain spectra.

2. The apparatus of claim 1, wherein the certain spectra is detected at specific angles relative to a direction of the impingement of radiation on the diffracting mechanism.

3. A broadband generator comprising:
a light source; and
a light diffracting mechanism, having adjustable elements, proximate to the light source, the elements are adjusted to diffract light from the light source as a specific spectrum or spectra; and
a spectrometer configured to calibrate and/or test based on the certain spectra.

4. The generator of claim 3, wherein the light source emits infrared light.

5. The generator of claim 3, further comprising a computer connected to the light diffracting mechanism.

6. The generator of claim 5, wherein the computer provides signals to the light diffracting mechanism for adjusting the elements.

7. The generator of claim 6, wherein the computer has sets of signals that represent specific substances in that such sets of signals sent to the light diffracting mechanism result in the elements being adjusted so as to provide spectra of the specific substances.

8. The generator of claim 7, wherein the light diffracting mechanism has a reflective grating.

9. The generator of claim 7, wherein the light diffracting mechanism has transmissive grating.

10. The generator of claim 3, further comprising collimating optics situated between the light source and the light diffracting mechanism.

11. A method for generating spectra, comprising:
providing radiation; and
adjustably diffracting the radiation into spectra;
conveying the spectra to a spectrometer; and
testing the spectrometer to see if it appropriately detects the spectra.

12. The method of claim 11, further comprising calibrating the spectrometer relative to the spectra.

13. The method of claim 11, further providing a plurality of sets of adjustments for adjusting the diffracting the radiation into specific spectra corresponding to each of the sets of adjustments, respectively.

14. The method of claim 11, further comprising: providing a mechanism for detecting the spectra to verify an output of appropriate spectra; and wherein the mechanism is placed at an adjustable angle relative to a direction of the radiation.

* * * * *